United States Patent
Rijnaarts et al.

[11] Patent Number: 5,919,351
[45] Date of Patent: Jul. 6, 1999

[54] METHOD OF IN-SITU CLEANING BY MEANS OF MICROORGANISMS OF A POLLUTED SOIL PORTION

[75] Inventors: Hubertus Henricus Martinus Rijnaarts, Nijmegen; Dirk Schmal, Leidschendam, both of Netherlands

[73] Assignee: Nederlandse Organisatie voor Toegepast Natuurwetenschappelijk Onderzoek TNO, Delft, Netherlands

[21] Appl. No.: 08/873,586

[22] Filed: Jun. 12, 1997

[30] Foreign Application Priority Data

Jun. 13, 1996 [NL] Netherlands ............. 1003327

[51] Int. Cl.[6] ................................. C02F 1/461
[52] U.S. Cl. ................. 205/701; 205/742; 205/766; 204/515; 204/516
[58] Field of Search ................... 204/515, 516; 205/742, 766, 701

[56] References Cited

U.S. PATENT DOCUMENTS 5,006,250 4/1991 Roberts et al. .
5,074,986 12/1991 Probstein et al. ............... 204/515
5,584,980 12/1996 Griffith et al. .................. 204/516

FOREIGN PATENT DOCUMENTS

| 3 800 713 | 8/1989 | Germany . |
| 4 011 174 | 8/1991 | Germany . |
| 4 306 846 | 9/1994 | Germany . |
| WO 87/01690 | 3/1987 | WIPO . |
| WO 93/22241 | 11/1993 | WIPO . |
| WO 95/29129 | 11/1995 | WIPO . |

Primary Examiner—Arun S. Phasge
Attorney, Agent, or Firm—Young & Thompson

[57] ABSTRACT

A method is described for the in-situ cleaning by means of microorganisms of a polluted soil portion which contains ground water. In this method, the soil portion to be cleaned is enclosed, and one or several electrodes which are permeable to liquid are placed in or adjacent the soil portion. A negative or positive voltage is applied to these electrodes. The enclosure of the polluted soil portion takes place in such a manner that the ground water present in the soil portion flows mainly through the one or several electrodes.

9 Claims, 2 Drawing Sheets

METHOD OF IN-SITU CLEANING BY MEANS OF MICROORGANISMS OF A POLLUTED SOIL PORTION

FIELD OF THE INVENTION

The invention relates to a method of in-situ cleaning by means of microorganisms of a polluted soil portion which comprises ground water.

BACKGROUND OF THE INVENTION

It is generally known that soil pollution is a worldwide problem. The present way of dealing with this problem is that the soil is isolated, after which the worst pollution is removed and stored elsewhere. Although this method is inexpensive, it does not provide a genuine solution to the problem. Another, promising method is the in-situ conversion by means of biological techniques. Here a conversion of the chemical compounds takes place in the soil itself by means of microorganisms which are present in the soil or which are added thereto later. This method is highly effective especially in the case of organic pollutants.

The above in-situ biological conversion method, however, leads to a number of problems. The main problem is that the growth of microorganisms already present in the soil or introduced into it at a later stage does not or substantially not take place, so that their effectivity is similarly poor.

The growth and activity of these microorganisms can be intensified by the presence of electron donors or electron acceptors. The problem of a bad growth of microorganisms would thus seem to be susceptible of a ready solution but for the fact that the dosage and even distribution of said electron donors and acceptors is found to be problematic in practice.

An example of a conversion of chemical compounds by means of microorganisms where a certain amount of electron donors is to be added to the soil under treatment is the biological breakdown of chlorinated hydrocarbons. An anaerobic phase is necessary in the biological breakdown of chlorinated hydrocarbons. During this phase under exclusion of oxygen, large quantities of electron donors are to be introduced into the soil. Usually, an electron donor such as, for example, hydrogen or an organic compound such as acetate, ethanol, or the like, dissolved in water, is pumped into the soil. Often, however, a satisfactory dosage of the electron donor throughout the soil portion is not obtained in this way. Instead, the above pumping process often leads to a choking effect and accordingly to a stagnation in the cleaning process of the polluted soil.

The anaerobic phase in the biological breakdown of chlorinated hydrocarbons must often be followed by an aerobic phase for ensuring a full decomposition of the polluting compounds. This oxygen-rich phase is usually effected through the injection of compressed air. A disadvantage of this method of supplying oxygen is that chlorinated hydrocarbons are volatilized thereby, which requires counteracting measures involving additional expense.

In addition, a separation between the anaerobic and aerobic zones is difficult to realize, as is the control of the ground water flow through the two zones, so that there is a risk of incomplete dissociation and the spread of toxic intermediate products.

SUMMARY OF THE INVENTION

The present invention has for its object to provide an improved method of in-situ cleaning of a polluted soil portion which comprises ground water by means of microorganisms. The method according to the invention is for this purpose characterized in that the soil portion to be cleaned is enclosed, and in that one or several electrodes permeable to liquid are placed in said soil portion, a negative or positive voltage being applied to the one or several electrodes, and the ground water flow is directed mainly through the one or several electrodes, while also one or several counterelectrodes having an opposed voltage are placed in the soil.

Electron donors or acceptors are generated in situ from the water present in the soil by the method according to the invention. An electron donor or acceptor, depending on the polarity of the voltage, is formed over the entire surface area of the electrodes. Since the surface area of the electrodes is comparatively large, preferably such that substantially all the ground water from the enclosed soil portion passes through it, this means that an even spread of electron donors or acceptors will take place over a large surface area. This situation is ideal for the microorganisms present or added which consume electron donors or acceptors. The microorganisms will grow and display an optimum activity in the conversion and breakdown of pollutants in the soil.

A positive or negative voltage is applied to the electrode in dependence on the nature of the pollution and the nature of the microorganisms which are to decompose the pollutants. The electrode which is permeable to liquid is placed in the soil in the desired location, and a second (counter) electrode is placed in the vicinity of the permeable electrode to close the electrical circuit. This counterelectrode in many cases acts merely as an antipole and may have various shapes. In the biological breakdown of chlorinated hydrocarbons, it is advantageous to insert an electrode having a negative voltage and permeable to liquid and an electrode having a positive voltage and permeable to liquid behind one another so as to create an anaerobic phase and an aerobic phase in succession. Both the first and the second electrode are accordingly permeable to liquid in this case.

In particular, the electrode comprises a substantially flat element which comprises an electron-conducting material at least at its surface, which element is provided with openings. Such an electrode provides a good spread of electron donors or acceptors in the soil while at the same time a good flow of the ground water with the pollutants therein is safeguarded.

Preferably, the electrode comprises an electron-conducting gauze material. Advantageously, the electrode comprises a metal.

When a positive voltage is applied to the electrode, electron acceptors such as, for example, oxygen are generated, whereas a negative voltage leads to the generation of electron donors such as, for example, hydrogen. Usually oxygen will be the electron acceptor and hydrogen the electron donor, but it can obviously be achieved through the introduction of certain compounds into the relevant soil portion that other acceptors or donors are generated.

Preferably, the soil portion is enclosed through the application of substantially vertical wall elements which are impermeable to water such that a flow of ground water directed by said walls passes through the electron-conducting elements present in or adjacent the soil portion. In a very advantageous embodiment, the soil portion to be cleaned is localized by means of a boundary of the soil portion formed by substantially vertical walls in which openings have been left in defined locations such that the ground water flow can leave the soil portion substantially only at said openings. The electrodes are placed between or adjacent the openings in this case.

Although the method according to the present invention was always carried out in situ in the polluted soil portion, it is obviously also possible to have the biological conversion reaction by means of microorganisms take place not at the location of the polluted soil portion itself, but instead in specially designed reactors in which a similar in-situ electrochemical generation of electron donors and/or acceptors is carried out.

The invention finally also relates to an electrode suitable for use in the method according to the invention as described above. This electrode comprises a substantially flat electron-conducting element made from a gauze material while at least the surface of the gauze material comprises an electron-conducting material such as, for example, a metal.

BRIEF DESCRIPTION OF THE DRAWINGS

The invention will be explained in more detail below with reference to the accompanying drawing, in which.

DETAILED DESCRIPTION OF THE INVENTION

Figure 1:
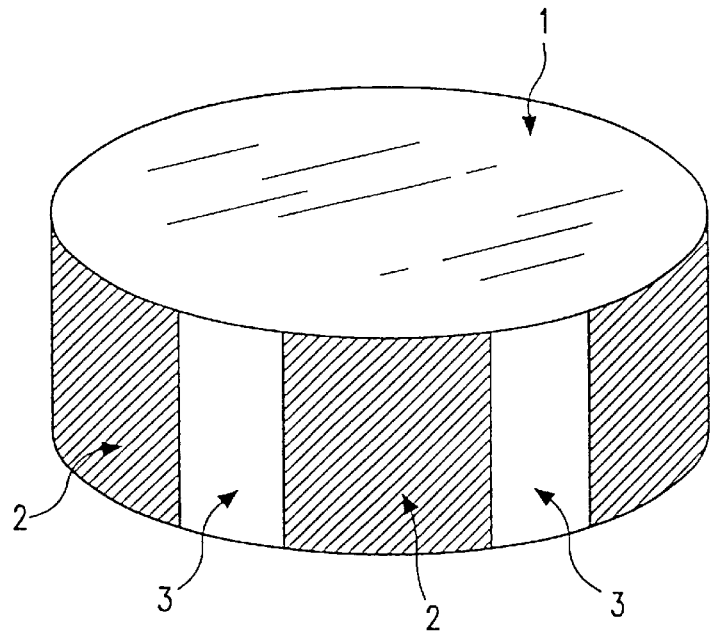
FIG. 1 diagrammatically shows a polluted soil portion bounded by walls in which openings have been left free.
Figure 2:
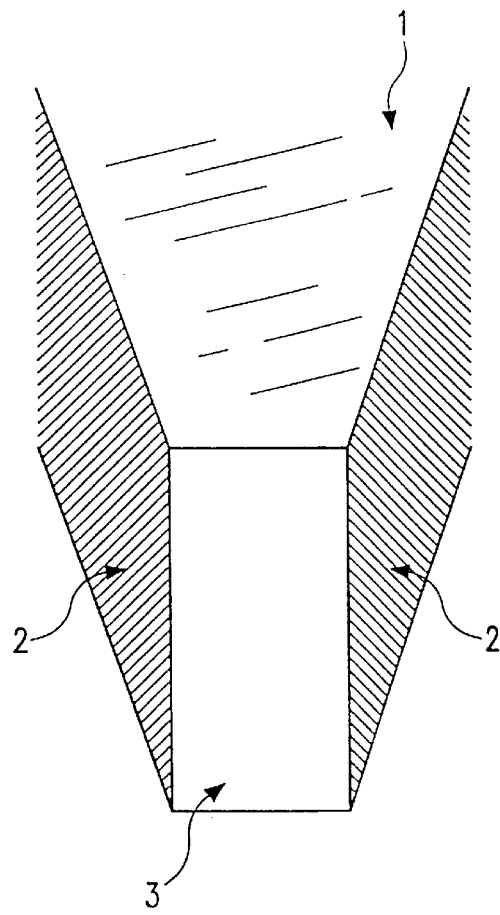
FIG. 2 diagrammatically shows a next soil portion bounded by walls.

FIG. 1 diagrammatically shows a polluted soil portion 1 which is enclosed by substantially vertical wall elements 2. These wall elements 2 may be, for example, known sheetpile walls which are impermeable to water. The soil portion 1 is not entirely surrounded by the wall elements or sheetpiles 2; openings 3 have been left therein. These openings 3 are also called bioscreens, and the configuration of the wall 2 in relation to the openings or bioscreens 3 is such that the ground water present in the polluted soil portion flows mainly from the soil portion bounded by the walls 2 through these openings 3. FIG. 2 also shows a polluted soil portion 1 bounded by walls. In this case the soil portion 1 is not entirely surrounded by the wall elements 2 outside the openings 3, but the wall elements 2 are so positioned in the polluted soil portion 1 that the flow of the ground water present in the soil portion is directed by the walls towards the opening 3. It is accordingly achieved both by the arrangement of FIG. 1 and by the arrangement of FIG. 2 that the ground water flow present in the polluted soil portion 1 is forced to leave this soil portion via the openings 3. This means that the polluting compounds present in the soil portion 1 and carried along by the ground water will also leave the soil portion 1 via the openings 3.

As was noted above in the present application, the microorganisms present in the soil are of themselves not active enough for converting or decomposing the polluting compounds. Conditions are to be created in which these microorganisms can optimally grow and show a corresponding activity in order to achieve such a conversion or decomposition. These conditions may be created in that an even distribution of electron donors or acceptors is provided in the soil. A number of microorganisms grow and are optimally active under the influence of electron donors, whereas other microorganisms function optimally under the influence of electron acceptors. The creation of a satisfactory spread of the electron donors or acceptors adjacent the openings 3 will accordingly lead to an optimum effectivity of the microorganisms in situ and thus to a complete decomposition of the pollutants from the polluted soil portion which pass through the opening.

The distribution of electron donors or acceptors through the soil as mentioned above can be achieved through the placement of electrodes permeable to liquid according to the present invention in or adjacent the openings 3. The electrode 4 according to the present invention comprises a flat, electron-conducting gauze 5 which is mounted, for example, in a framework 6 and which has a size which preferably corresponds to that of the opening(s) 3. A negative voltage for generating electron donors or a positive voltage for generating electron acceptors is applied to the gauze 5. A second electrode 7 is connected to an opposed voltage at a greater or smaller distance from the electrode 4 so as to close the circuit. This second electrode may be a "normal" electrode, or alternatively also an electrode permeable to liquid according to the present invention. This second situation is shown in FIG. 4, where a first electrode 4 permeable to liquid is connected to a negative pole 8 of a DC voltage source 10, and a second electrode 7 permeable to liquid is placed immediately next to the first and is connected to a positive pole 9 of the DC voltage source 10.

Figure 3:
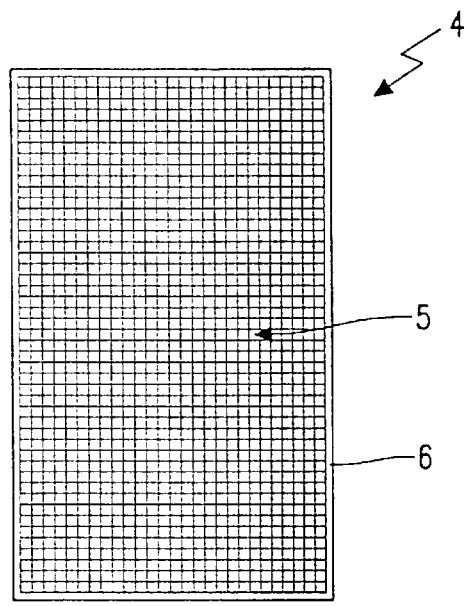
FIG. 3 diagrammatically shows an electrode according to the present application.
Figure 4:
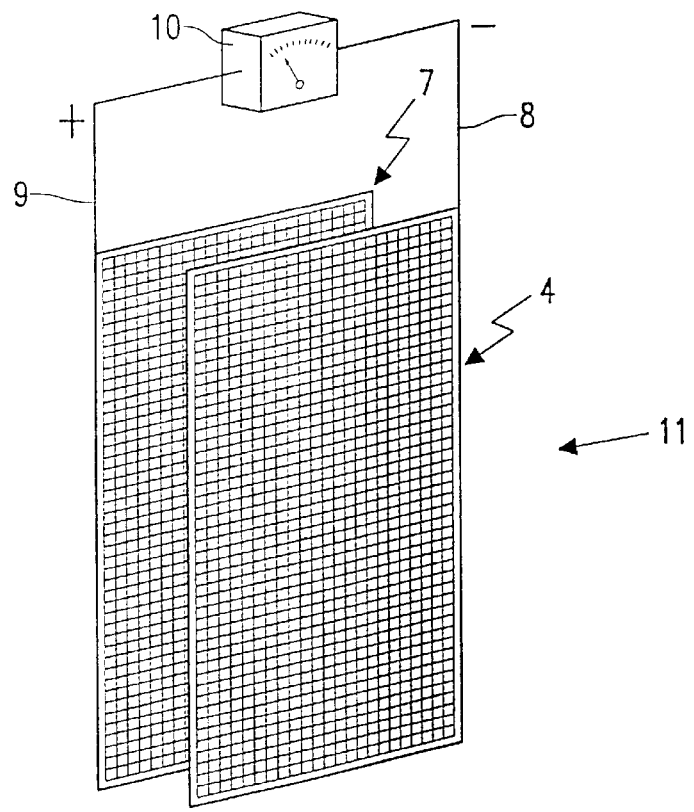
FIG. 4 is a diagrammatic partial side elevation of two electrodes according to the invention placed behind one another and having mutually opposed charge polarities.

When the electrodes of FIG. 3 and FIG. 4 are placed in the openings 3 of a polluted soil portion 1 bounded by walls 2, the following situations arise. If an element according to FIG. 3 is placed in the opening 3, a good spread of electron donors or acceptors is achieved at the area of the opening, depending on the voltage applied to the gauze. The application of a negative voltage leads to the formation of electron donors, of a positive voltage to the formation of electron acceptors. A voltage is applied to the gauze in dependence on the pollutants and the microorganisms present in the soil such that optimized conditons will prevail for the effectivity of the microorganisms present in the soil. It is noted that supplementary microorganisms and/or chemicals may be added to the soil portion in order to obtain an even better or more complete breakdown or conversion of the pollutants.

If an electrode according to FIG. 4 is placed in the opening, a ground water flow passing through the opening 3, indicated with an arrow 11, will first come into contact with the negative electrode, where microorganisms grow which utilize elctron donors for their growth and activity, and will then come into contact with a positive electrode, where those microorganisms thrive which utilize electron acceptors. The order of the electrodes may obviously be reversed in cases where this is desirable. An improved decomposition of pollutants can thus be obtained in that certain compounds are first partly broken down at the one electrode and subsequently further broken down at the other electrode.

Example

The method according to the invention will now be elucidated with an example. Ground water containing 10 mg perchloroethylene per liter is pumped through an electrode according to the present invention and having a surface area of 1 $m^2$ at a rate of 5 m per 24 hours. The electrode comprises two electron-conducting gauze elements of 1 $m^2$ each placed one behind the other. The mutual interspacing of the two electron-conducting gauze elements is 2 cm. The elements are connected to a DC voltage source. When water is pumped through the electrode it is found that, after the growth of microorganisms already present has gathered momentum, approximately 10 mole, i.e. 20 g, hydrogen produced by the electrodes is necessary by way of electron donor for converting more than 90% of the perchloroethylene present in the ground water. The electrical energy required for the conversion is approximately 10 kWh per $m^3$ of ground water flowing through.

We claim:

1. A method of biologically cleaning polluted soil with microorganisms in situ, which comprises:

enclosing a portion of the polluted soil to be cleaned;

placing at least one electrode permeable to liquid in said portion of polluted soil;

applying a negative or positive voltage to said at least one electrode to generate from ground water present in the soil electron donors or acceptors, which intensify the growth and activity of microorganisms in the soil;

directing a flow of ground water primarily through said at least one electrode; and placing at least one counter electrode having an opposed voltage in said portion of said polluted soil.

2. The method according to claim 1, wherein at least one electrode pair formed by two electrodes of opposite polarity which are permeable to liquid and are positioned one behind the other, is placed in the soil portion.

3. The method according to claim 1, wherein the electrode comprises an electron-conducting material at least at its surface, said electrode being formed by an at least substantially flat element which is provided with openings.

4. The method according to claim 1, wherein the electrode comprises a gauze material.

5. The method according to claim 1, wherein the electrode comprises a metal.

6. The method according to claim 1, wherein the portion of the polluted soil is enclosed with substantially vertical wall elements such that the flow of ground water is directed through said at least one electrode present in the soil portion.

7. The method according to claim 1, wherein the portion of soil to be cleaned is enclosed by a boundary formed by substantially vertical walls having openings at defined locations such that the flow of ground water can leave the soil portion substantially only at said openings.

8. The method according to claim 1, wherein the at least one electrode is placed in or adjacent the openings.

9. The method according to claim 1, wherein the portion of soil is enclosed by transferring said soil portion to a container.

* * * * *